(12) United States Patent
Moran

(10) Patent No.: US 11,035,090 B2
(45) Date of Patent: Jun. 15, 2021

(54) FLEX SLIDE SYSTEM

(71) Applicant: Seahorse Fender & Docking "LLC.", Ft. Myers Beach, FL (US)

(72) Inventor: Michael Moran, Ft. Myers Beach, FL (US)

( * ) Notice: Subject to any disclaimer, the term of this patent is extended or adjusted under 35 U.S.C. 154(b) by 0 days.

(21) Appl. No.: 16/790,427

(22) Filed: Feb. 13, 2020

(65) Prior Publication Data

US 2020/0263377 A1     Aug. 20, 2020

Related U.S. Application Data

(60) Provisional application No. 62/805,580, filed on Feb. 14, 2019.

(51) Int. Cl.
*E02B 3/26* (2006.01)
*B63C 1/02* (2006.01)

(52) U.S. Cl.
CPC . *E02B 3/26* (2013.01); *B63C 1/02* (2013.01)

(58) Field of Classification Search
CPC .......... E02B 3/26; E02B 17/003; E02B 3/064; Y02A 30/36; B63C 1/02
See application file for complete search history.

(56) References Cited

U.S. PATENT DOCUMENTS

| | | | | |
|---|---|---|---|---|
| 4,281,610 A * | 8/1981 | Young | .................. | E02B 3/26 114/219 |
| 5,138,965 A * | 8/1992 | Culp | .................. | E02B 3/24 114/219 |
| 5,493,991 A * | 2/1996 | Wright | .................. | B63B 21/00 114/230.27 |
| 5,603,280 A * | 2/1997 | Shackelford, Jr. | ........ | E02B 3/24 114/230.27 |
| 5,762,016 A * | 6/1998 | Parsons | .................. | E02B 3/24 114/219 |
| 5,957,073 A * | 9/1999 | Kerber | .................. | B63B 59/02 114/219 |
| 8,025,019 B1 * | 9/2011 | Katulka | .................. | E02B 3/26 114/220 |
| 9,061,737 B2 * | 6/2015 | Mahlich | .................. | B63B 21/04 |
| 2015/0314841 A1 * | 11/2015 | Moran | .................. | E02B 3/26 114/219 |
| 2017/0335532 A1 * | 11/2017 | Nail | .................. | F16B 45/00 |

\* cited by examiner

*Primary Examiner* — Carib A Oquendo
(74) *Attorney, Agent, or Firm* — George F. Wallace

(57) ABSTRACT

A floating object securement system configured to provide limited movement between a floating dock and a support structure while not squeaking or making other obnoxious noises is disclosed. The floating object securement system may include a slidable base configured to slide along a track that confines the slidable base to only lateral movement generally aligned with a longitudinal axis of the track. The floating object securement system may include a primary movement control member coupled to the slidable base and extending outwardly from the slidable base. The primary movement control member provides limited movement and rotation of the bracket relative to the slidable base about X, Y and Z axes while not squeaking or making other obnoxious noises.

15 Claims, 11 Drawing Sheets

FLEX SLIDE SYSTEM

CROSS REFERENCE

This application claims the benefit of U.S. Patent Provisional Application No. 62/805,580, filed Feb. 14, 2019, the entirety of which is incorporated by reference.

FIELD OF THE APPLICATION

This application is directed generally to floating docks, and more particularly to systems for securing floating docks to non-floating structures.

BACKGROUND

Floating docks can include modular or sectional floats that are movably attached to each other. The connections between the modular or sectional floats must be strong enough to sustain the sometimes constant movement created by the action of wind and waves against the dock. The modular or sectional floats must also be maintained in orientation and position relative to each other to provide a safe, usable dock structure and surface.

SUMMARY

A floating object securement system configured to provide limited movement between a floating dock and a support structure while not squeaking or making other obnoxious noises is disclosed.

The floating object securement system may include a slidable base configured to slide along a track that confines the slidable base to only lateral movement generally aligned with a longitudinal axis of the track. The floating object securement system may include a primary movement control member coupled to the slidable base and extending outwardly from the slidable base. The primary movement control member provides limited movement and rotation of the bracket relative to the slidable base about X, Y and Z axes while not squeaking or making other obnoxious noises.

A floating object securement system may include a slidable base configured to slide along a track, where the track is configured to limit movement of the slidable base. The floating object securement system may also include a primary movement control member coupled to the slidable base and extending outwardly from the slidable base, and a bracket coupled to the primary movement control member remote from the slidable base. The primary movement control member may provide limited rotation of the bracket relative to the slidable base about x, y and z axes.

These and other embodiments are described in more detail below.

BRIEF DESCRIPTION OF THE DRAWINGS

The accompanying drawings, which are incorporated in and form a part of the specification, illustrate embodiments and, together with the description, disclose the principles of the application.

DETAILED DESCRIPTION OF THE INVENTION

Figure 1:
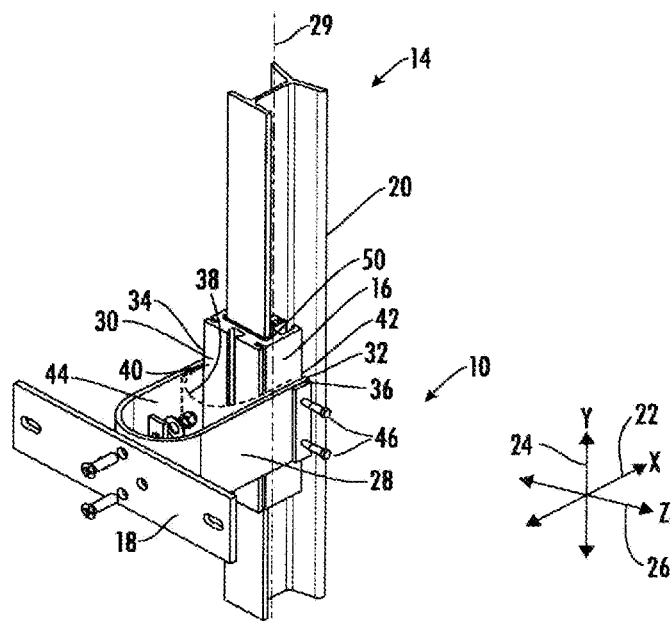
FIG. 1 is a perspective view of the floating object securement system.
Figure 2:
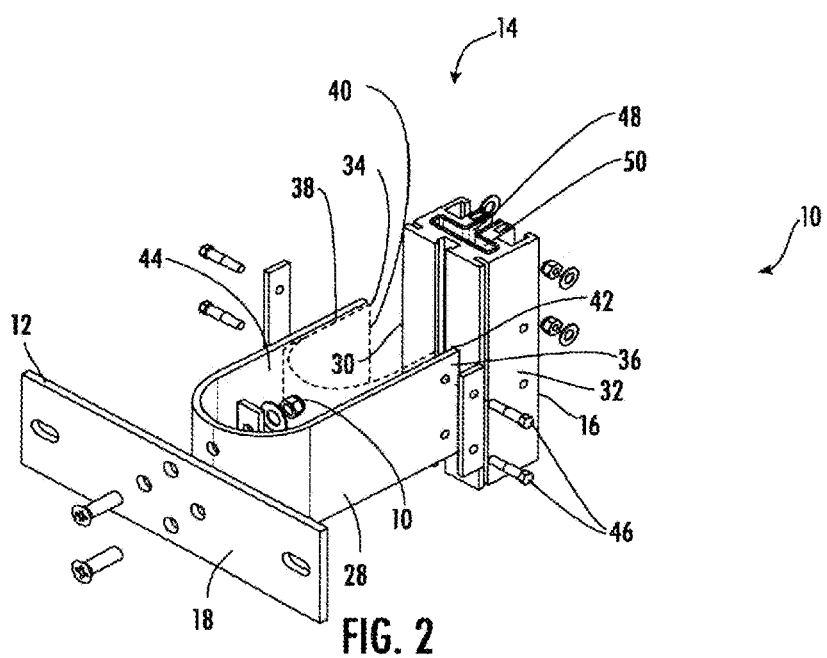
FIG. 2 is an exploded perspective view of the floating object securement system.
Figure 3:
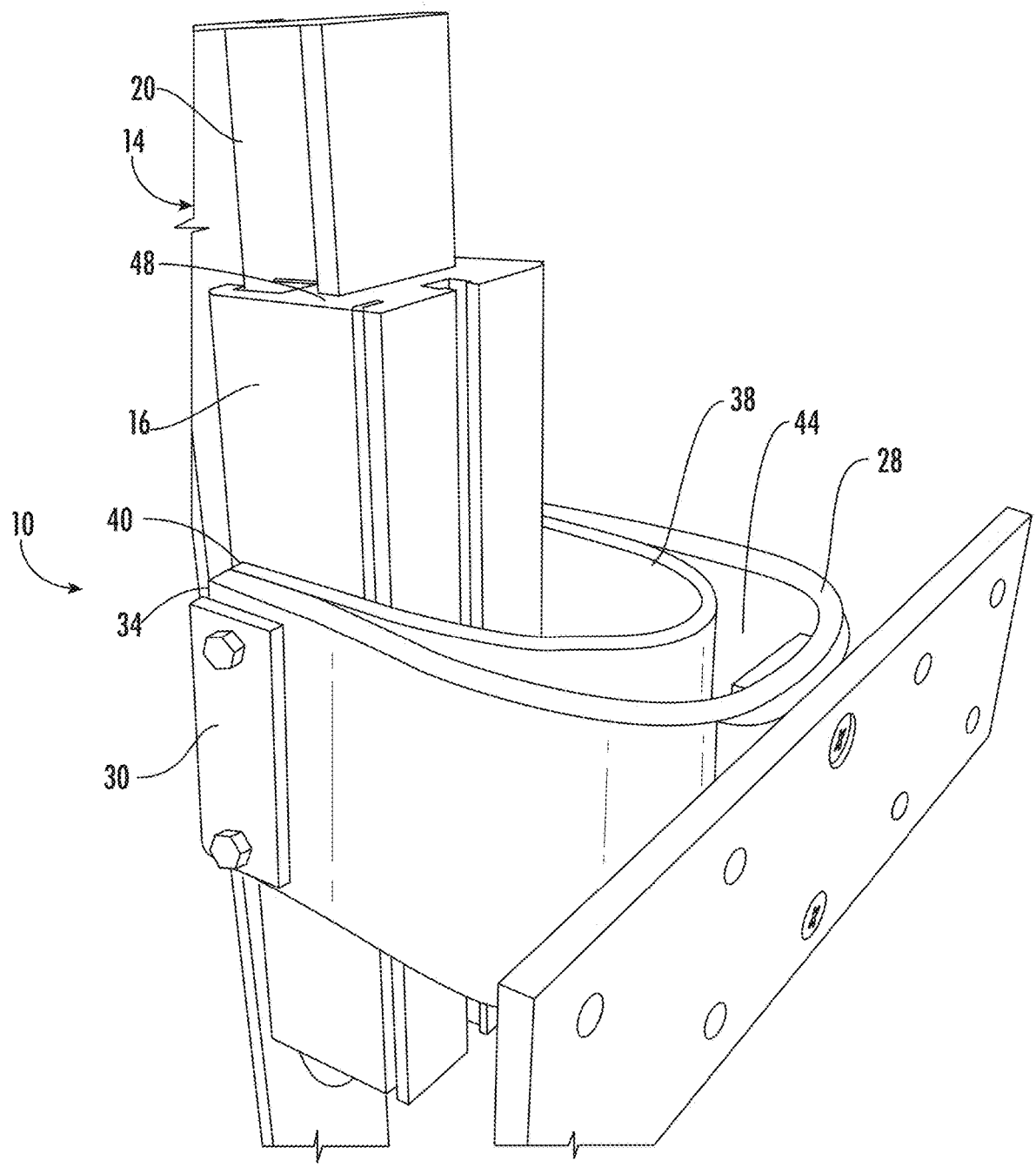
FIG. 3 is a perspective view of the floating object securement system.
Figure 4:
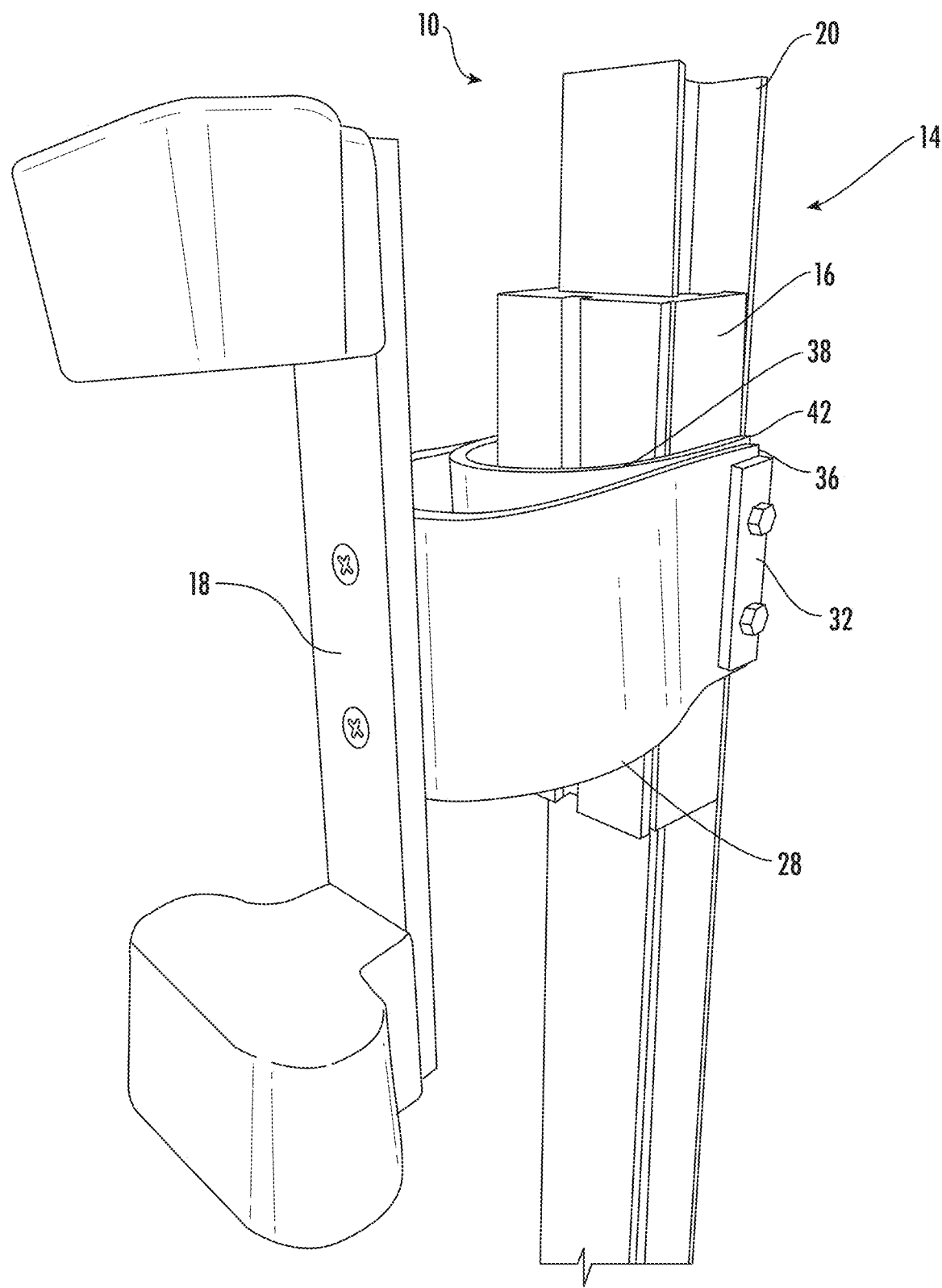
FIG. 4 is a perspective view of the floating object securement system with an alternative bracket attached thereto.
Figure 5:
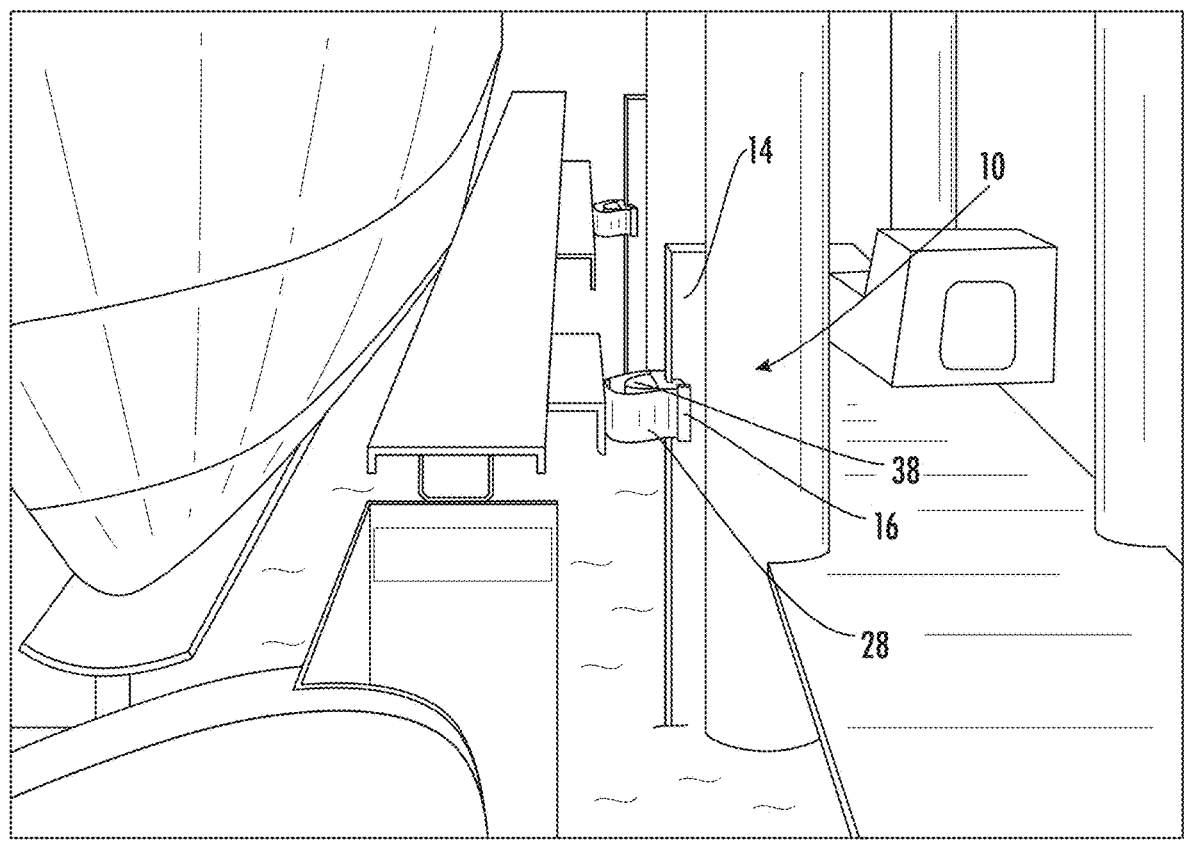
FIG. 5 is a photograph of the floating object securement system in use as a shock absorber for a boat lift.
Figure 6:
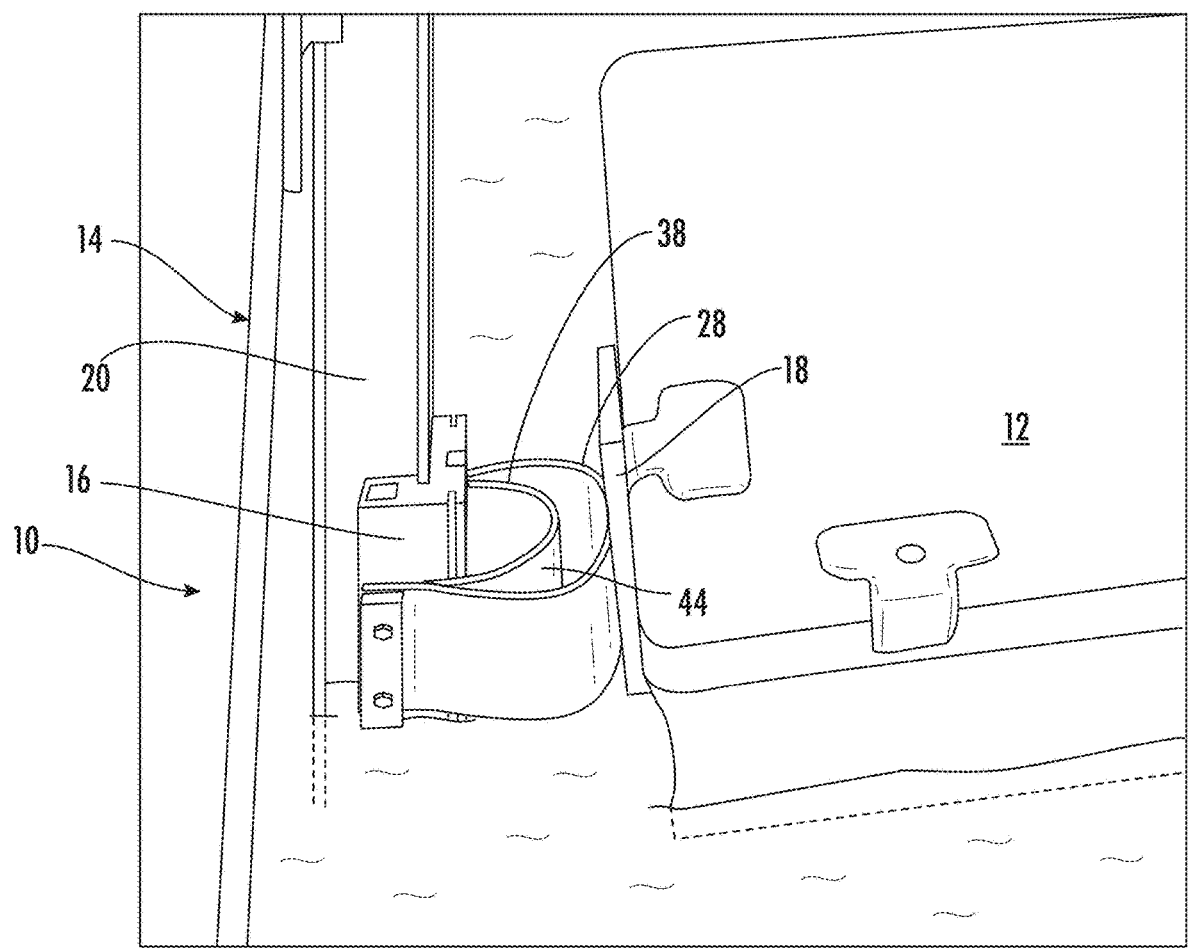
FIG. 6 is a photograph of the floating object securement system in use securing a floating dock.
Figure 7:
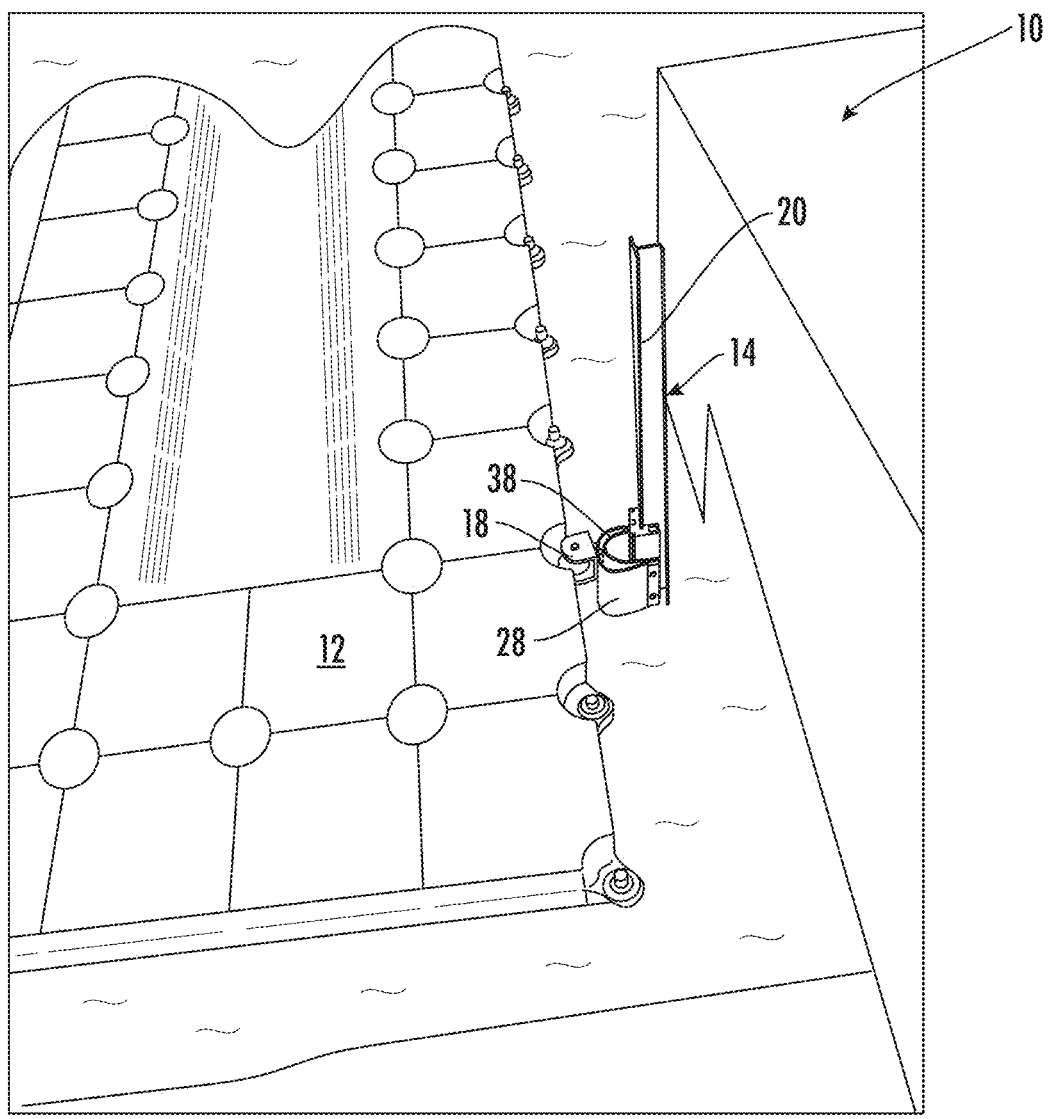
FIG. 7 is a photograph of the floating object securement system in use securing floating vessel storage.
Figure 8:
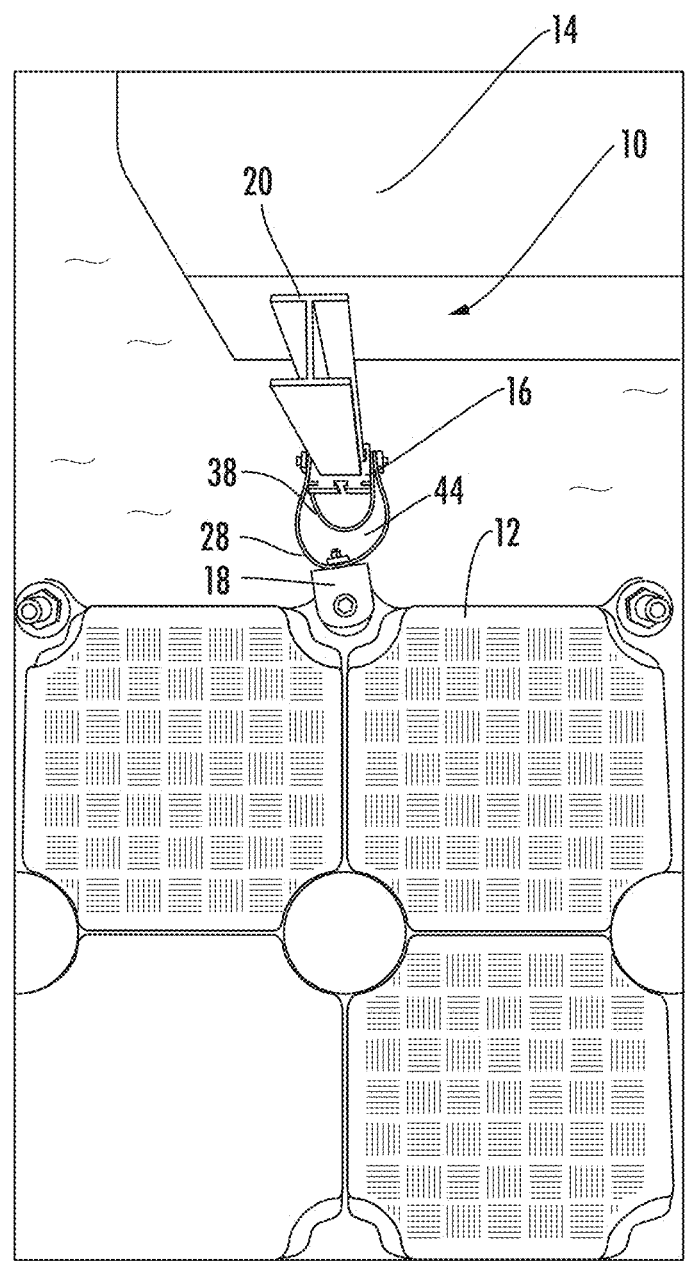
FIG. 8 is another view of the floating object securement system shown in FIG. 7.
Figure 9:
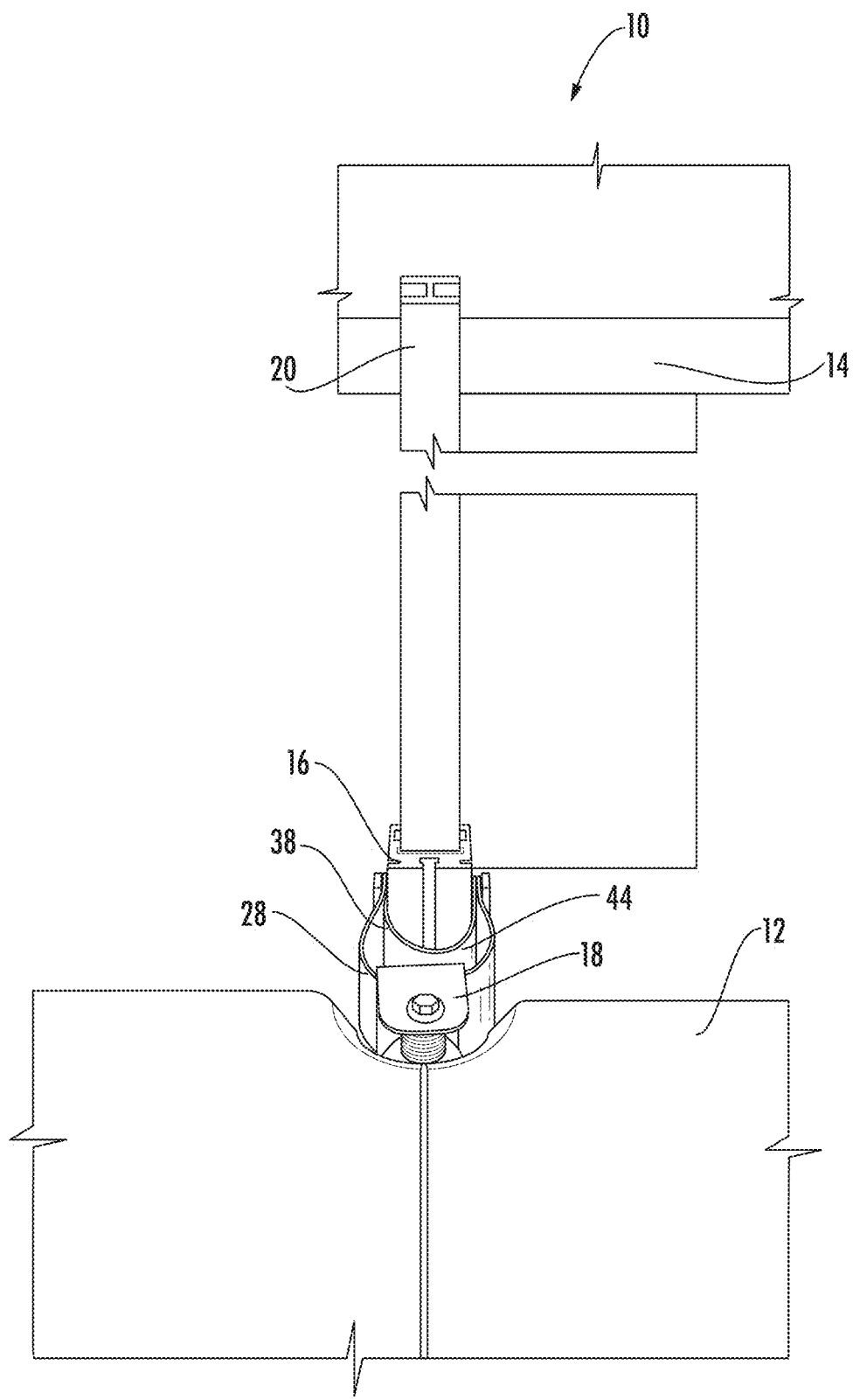
FIG. 9 is another view of the floating object securement system shown in FIG. 7.
Figure 10:
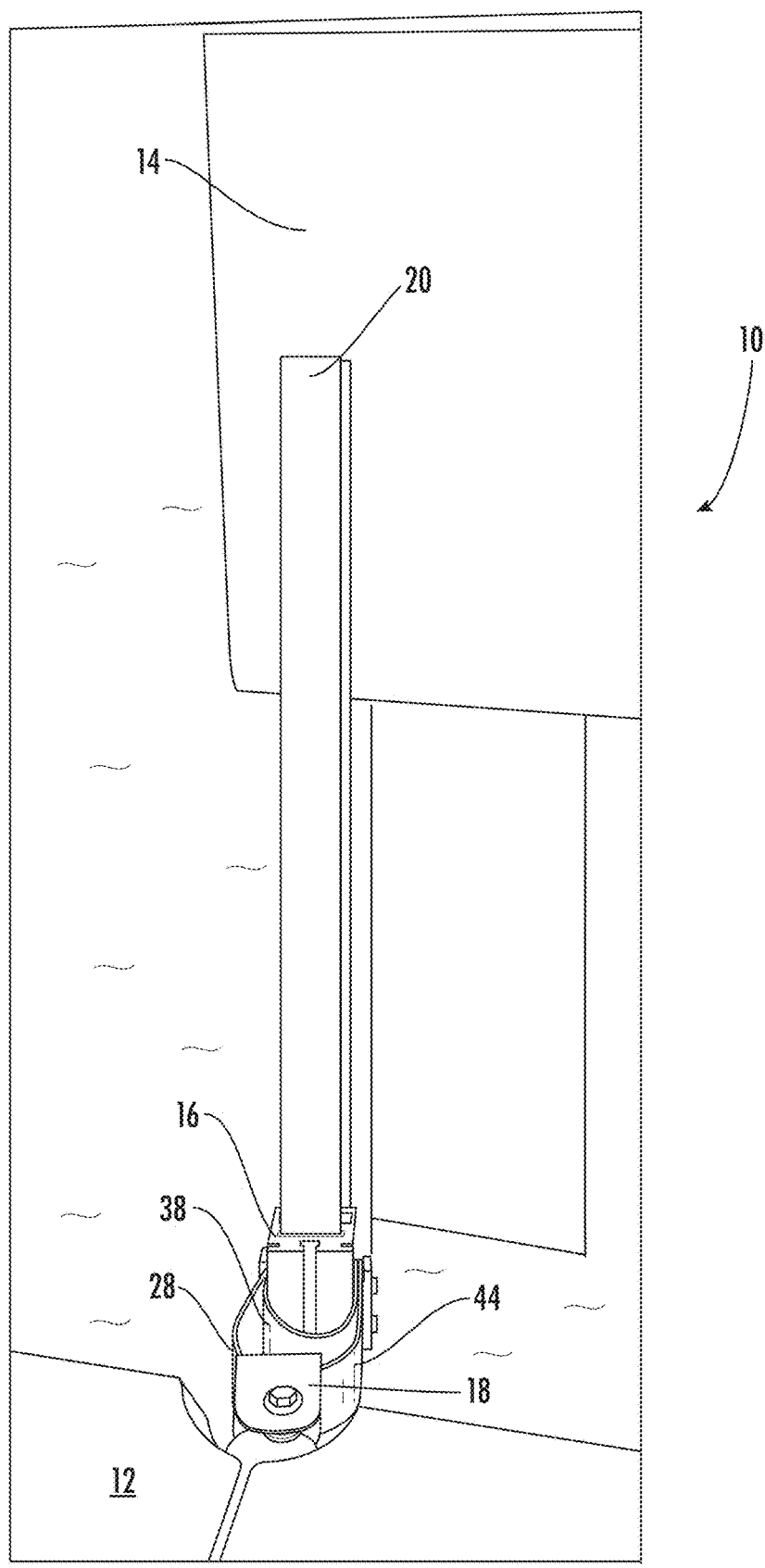
FIG. 10 is another view of the floating object securement system shown in FIG. 7.
Figure 11:
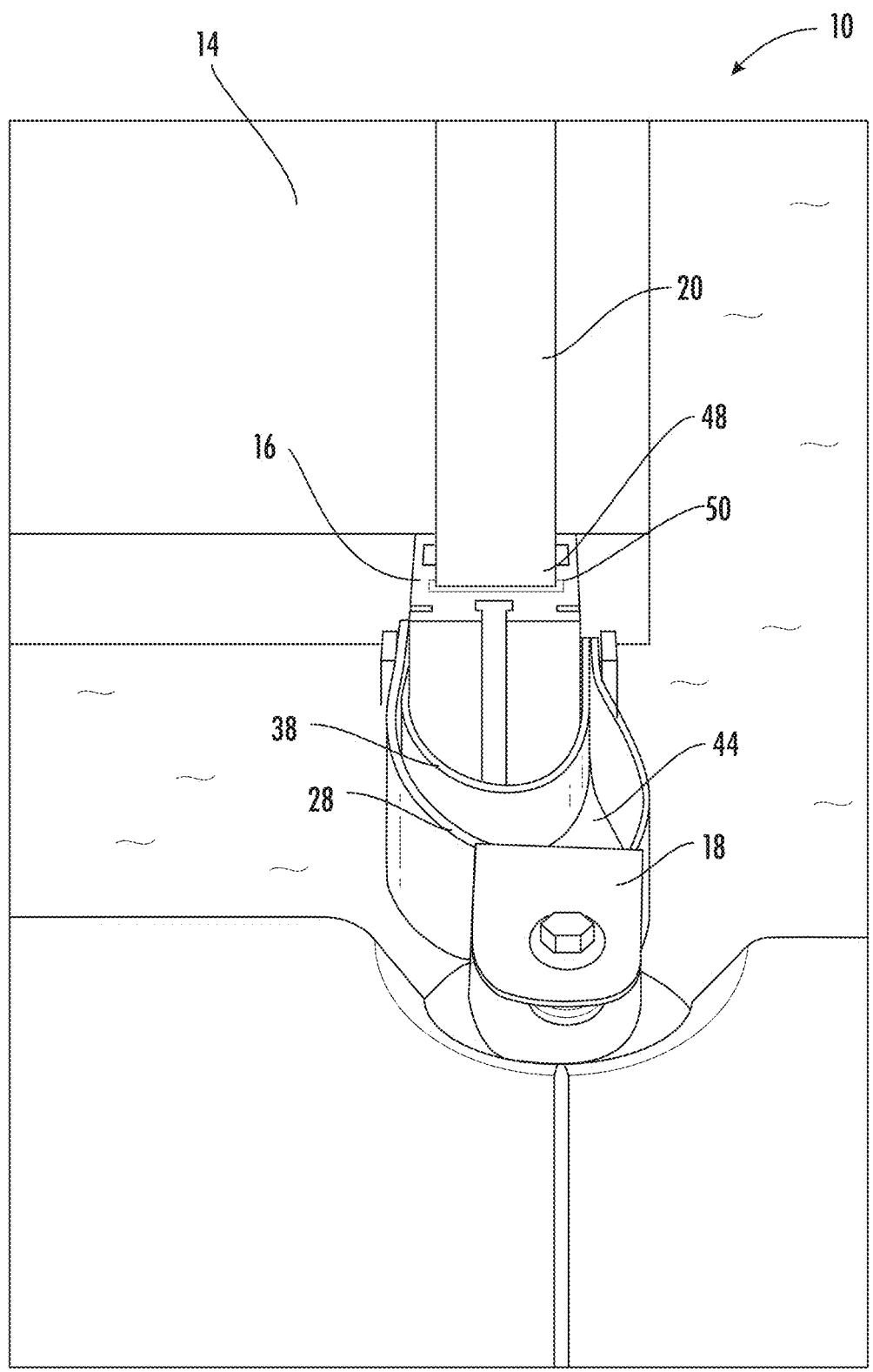
FIG. 11 is a photograph of another embodiment of the floating object securement system in which a secured item is attached directly to the primary movement control member.
Figure 12:
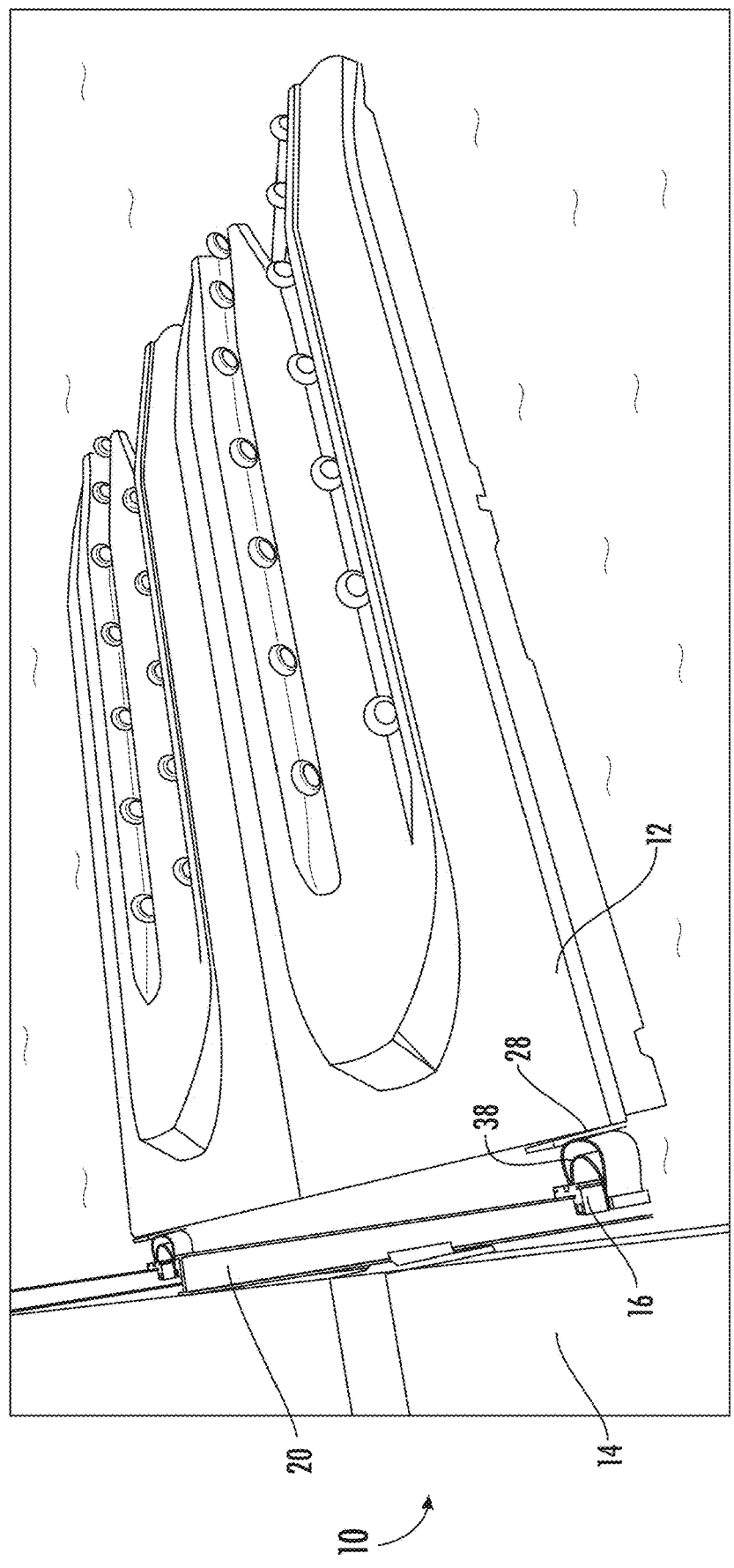
FIG. 12 is a photograph of the floating object securement system in use securing floating vessel storage.

As shown in FIGS. 1-12, a floating object securement system 10 configured to provide limited movement between a floating dock 12 and a support structure 14 while not squeaking or making other obnoxious noises is disclosed. The floating object securement system 10 may include a slidable base 16 configured to slide along a track that confines the slidable base 16 to only lateral movement generally aligned with a longitudinal axis 29 of the track 20. The floating object securement system 10 may include a primary movement control member coupled to the slidable base 16 and extending outwardly from the slidable base 16. The primary movement control member provides limited movement and rotation of the bracket 18 relative to the slidable base 16 about X, Y and Z axes 22, 24, 26 while not squeaking or making other obnoxious noises.

In at least one embodiment, a floating object securement system 10 may include a slidable base 16 configured to slide along a track 20 whereby the track 20 configured to limit movement of the slidable base 16. The floating object securement system 10 may include a primary movement control member 28 coupled to the slidable base 16 and extending outwardly from the slidable base 16. The floating object securement system 10 may include a bracket 18 coupled to the primary movement control member 28 remote from the slidable base 16, whereby the primary movement control member 28 provides limited rotation of the bracket 18 relative to the slidable base 16 about X, Y and Z axes 22, 24, 26. The track 20 and slidable base 16 may be configured to only allow movement of the slidable base 16 relative to the track 20 along a longitudinal axis 29 of the track 20.

The primary movement control member 28 may be formed from a resilient material such that the primary movement control member 28 absorbs shock forces without elastically deforming. In at least one embodiment, the resilient material may be a conveyor belt. The primary movement control member 28 may be a single piece of material. The primary movement control member 28 may be formed from multiple pieces of material laid flat against each other. The primary movement control member 28 may be coupled to the slidable base 16 such that the primary movement control member 28 forms a loop extending outwardly from the slidable base 16. The primary movement control member 28 may be coupled to a first side 30 of the slidable base 16 proximate to a first end 34 of the primary movement control member 28 and to a second side 32 of the slidable base 16 proximate to a second end 36 of primary movement control member 28, whereby a length of material forming the primary movement control member 28 measured along the material from a location where the primary movement control member 28 is attached to the slidable base 16 on the first side 30, along the primary movement control member 28 to a location wherein the primary movement control member 28 is attached to the slidable base 16 on the second side 32 is greater than a distance between the first and second sides 30, 32 of the slidable base 16, thereby creating a loop in the primary movement control member 28 when attached to the slidable base 16.

A secondary movement control member 38 may be coupled to the slidable base 16 and configured to engage the primary movement control member 28 only upon significant compression of the primary movement control member 28 (such as the forces sustained in a large strike to a floating dock 12). The secondary movement control member 38 may provide additional shock adsorption if the system undergoes a large blow. The secondary movement control member 38 may be formed from a resilient material such that the secondary movement control member 38 absorbs shock forces without elastically deforming. The resilient material may be a conveyor belt. In at least one embodiment, the conveyor belt may be, but is not limited to being, between 3 inches and 7 inches in height. The secondary movement control member may be a single piece of material. The secondary movement control member 38 may be coupled to the slidable base 16 such that the secondary movement control member 38 forms a loop extending outwardly from the slidable base 16. The secondary movement control member 38 may be coupled to a first side 30 of the slidable base 16 proximate to a first end 40 of the secondary movement control member 38 and to a second side 32 of the slidable base 16 proximate to a second end 42 of secondary movement control member 38, whereby a length of material forming the secondary movement control member 38 measured along the material from a location where the secondary movement control member 38 is attached to the slidable base 16 on the first side 30, along the secondary movement control member 38 to a location wherein the secondary movement control member 38 is attached to the slidable base 16 on the second side 32 is greater than a distance between the first and second sides 30, 32 of the slidable base 16, thereby creating a loop in the secondary movement control member 38 when attached to the slidable base 16, and wherein the loop formed by the secondary movement control member 38 extends outwardly from the slidable base 16 a distance that is less than a distance by which the primary movement control member 28 extends from the slidable base 16. The loop formed by the secondary movement control member 38 may be positioned within an open chamber 44 formed by the loop of the primary movement control member 28.

The primary movement control member 28 may be coupled to the slidable base 16 via one or more attachment devices 46, such as, but not limited to, connectors, releasable connectors and mechanical fixation systems. In at least one embodiment, the primary movement control member 28 may be coupled to the slidable base 16 with a bolts.

In at least one embodiment, the slidable base 16 may be formed from one or more members. In at least one embodiment, the slidable base 16 may be extruded metal, such as, but not limited to, aluminum. The slidable base 16 may include an open channel 48 configured to slide along a track 20. In at least one embodiment, the track 20 may be, but it not limited to being, an I-beam, t-beam or the like. The slidable base 16 may be configured such that the slidable base 16 includes an open channel 48 configured to slidably receive the track 20 and prevent rotation about X, Y and Z axes 22, 24, 26 and prevent any and all linear movement except for linear movement along a longitudinal axis 29 of the track 20.

In at least one embodiment, the open channel 48 may be sized to include a nonmetallic insert 50 configured to prevent noise from being generated as the slidable base 16 moves along the track 20. The insert 50 may be configured to fit within the open channel and form the contact points at which the track 20 contacts the slidable base 16. In at least one embodiment, the insert may be formed from, but is not limited to being, nylon.

The floating object securement system 10 may include a bracket 18 coupled to the primary movement control member 28 remote from the slidable base 16. The bracket 18 may be any desired size and shape. The bracket 18 may be a rectangular plate attached to the primary movement control member 28 in a horizontal or vertical orientation. Items 12, such as, but not limited to, floating docks 12, floating boat storage modules, bumper caddies and other items, may be attached to the bracket 18. The bracket 18 may also be configured for other custom uses. In other embodiments, the floating object securement system 10 may not use a bracket 18 but may instead be attached directly to the object desired to be supported, such as, but not limited to, a floating dock.

During use, the floating object securement system 10 enables the item 12 attached to the system 10 to have limited movement, such as a floating dock moving due to forces from tide, wind, boat wake, boat collusion and others. The floating object securement system 10 enables the item 12 attached to the system 10 to have limited movement without any obnoxious noise. The primary and secondary movement control members 28, 38 flex without making noise which is a significant advantage over previously existing systems.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A floating object securement system, comprising:
    a slidable base configured to slide along a track, the track being configured to limit movement of the slidable base;
    a primary movement control member coupled to the slidable base and extending outwardly from the slidable base; and
    a bracket coupled to the primary movement control member remote from the slidable base;
    wherein the primary movement control member deformably provides rotation of the bracket relative to the slidable base about x, y and z axes, such that the primary movement control member deforms in a manner visually perceivable by a human naked eye.

2. The floating object securement system of claim 1, wherein the track and slidable base are configured to only allow movement of the slidable base relative to the track along a longitudinal axis of the track.

3. The floating object securement system of claim 1, wherein the primary movement control member is formed from a resilient material such that the primary movement control member absorbs shock forces without elastically deforming.

4. The floating object securement system of claim 3, wherein the resilient material is a conveyor belt.

5. The floating object securement system of claim 1, wherein the primary movement control member is a single piece of material.

6. The floating object securement system of claim 1, wherein the primary movement control member is formed from multiple pieces of material laid flat against each other.

7. The floating object securement system of claim 1, wherein the primary movement control member is coupled to the slidable base such that the primary movement control member forms a loop extending outwardly from the slidable base.

8. The floating object securement system of claim 7, wherein the primary movement control member is coupled to a first side of the slidable base proximate to a first end of the primary movement control member and to a second side of the slidable base proximate to a second end of primary movement control member, whereby a length of material forming the primary movement control member measured along the material from a location where the primary movement control member is attached to the slidable base on the first side, along the primary movement control member to a location wherein the primary movement control member is attached to the slidable base on the second side is greater than a distance between the first and second sides of the slidable base, thereby creating a loop in the primary movement control member when attached to the slidable base.

9. The floating object securement system of claim 1, further comprising a secondary movement control member coupled to the slidable base and configured to engage the primary movement control member only upon significant compression of the primary movement control member (such as the forces sustained in a large strike to a floating dock).

10. The floating object securement system of claim 9, wherein the secondary movement control member is formed from a resilient material such that the secondary movement control member absorbs shock forces without elastically deforming.

11. The floating object securement system of claim 10, wherein the resilient material is a conveyor belt.

12. The floating object securement system of claim 9, wherein the secondary movement control member is a single piece of material.

13. The floating object securement system of claim 1, wherein the secondary movement control member is coupled to the slidable base such that the secondary movement control member forms a loop extending outwardly from the slidable base.

14. The floating object securement system of claim 13, wherein the secondary movement control member is coupled to a first side of the slidable base proximate to a first end of the secondary movement control member and to a second side of the slidable base proximate to a second end of secondary movement control member, whereby a length of material forming the secondary movement control member measured along the material from a location where the secondary movement control member is attached to the slidable base on the first side, along the secondary movement control member to a location wherein the secondary movement control member is attached to the slidable base on the second side is greater than a distance between the first and second sides of the slidable base, thereby creating a loop in the secondary movement control member when attached to the slidable base, and wherein the loop formed by the secondary movement control member extends outwardly from the slidable base a distance that is less than a distance by which the primary movement control member extends from the slidable base.

15. The floating object securement system of claim 14, wherein the loop formed by the secondary movement control member is positioned within an open chamber formed by the loop of the primary movement control member.

\* \* \* \* \*